(12) United States Patent
Evans et al.

(10) Patent No.: US 11,509,942 B2
(45) Date of Patent: Nov. 22, 2022

(54) SYSTEM AND METHOD FOR LIVE VIDEO FEED

(71) Applicant: BAMTECH, LLC, New York, NY (US)

(72) Inventors: Chad Evans, New York, NY (US); Matthew Restivo, New York, NY (US)

(73) Assignee: BAMTech, LLC, New York, NY (US)

( * ) Notice: Subject to any disclaimer, the term of this patent is extended or adjusted under 35 U.S.C. 154(b) by 257 days.

(21) Appl. No.: 15/993,353

(22) Filed: May 30, 2018

(65) Prior Publication Data

US 2019/0110085 A1    Apr. 11, 2019

Related U.S. Application Data

(60) Provisional application No. 62/570,992, filed on Oct. 11, 2017.

(51) Int. Cl.

| H04N 7/173 | (2011.01) |
|---|---|
| H04N 21/2187 | (2011.01) |
| H04N 21/254 | (2011.01) |
| H04N 21/643 | (2011.01) |
| H04N 21/658 | (2011.01) |
| H04N 21/488 | (2011.01) |
| H04N 21/442 | (2011.01) |

(52) U.S. Cl.
CPC ..... *H04N 21/2187* (2013.01); *H04N 21/2541* (2013.01); *H04N 21/44213* (2013.01); *H04N 21/4882* (2013.01); *H04N 21/64322* (2013.01); *H04N 21/658* (2013.01)

(58) Field of Classification Search
CPC ........... H04N 21/2187; H04N 21/4438; H04N 21/4788; H04N 21/252; H04N 21/2668
USPC ................ 725/116, 39, 41, 64, 87, 57, 5, 32
See application file for complete search history.

(56) References Cited

U.S. PATENT DOCUMENTS

| 2002/0157101 A1 * | 10/2002 | Schrader | H04N 5/4401 725/64 |
|---|---|---|---|
| 2008/0066111 A1 * | 3/2008 | Ellis | H04N 5/44543 725/57 |
| 2008/0195664 A1 * | 8/2008 | Maharajh | G06Q 10/10 |
| 2015/0201247 A1 * | 7/2015 | Henderson | H04N 21/41415 725/5 |

* cited by examiner

*Primary Examiner* — Jivka A Rabovianski
(74) *Attorney, Agent, or Firm* — Fay Kaplun & Marcin, LLP

(57) ABSTRACT

A server, system, and method generate a live video feed. The method is performed at a server connected to a computer network. The method includes receiving an indication of a predetermined type of action during a live event. The method includes generating a first video feed associated with the predetermined type of action, the first video feed being distinct from a broadcast feed of the live event. The method includes identifying a user device that is to receive the first video feed based on predetermined rules. The method includes determining whether the user device is prepared to receive the first video feed. When the user device is prepared, the method includes transmitting the first video feed to the user device for an automatically playback on the user device to display a video of the predetermined type of action currently occurring during the live event.

19 Claims, 5 Drawing Sheets

SYSTEM AND METHOD FOR LIVE VIDEO FEED

FIELD

The present disclosure relates generally to streaming and displaying live video feed, including, but not limited to, real-time streaming of a dedicated live video feed via a communication network to a plurality of user devices for automatic presentation.

BRIEF DESCRIPTION OF THE DRAWINGS

Various objects, aspects, features, and advantages of the exemplary embodiments and implementations of the disclosure will become more apparent and better understood by referring to the detailed description taken in conjunction with the accompanying drawings.

Figure 1:
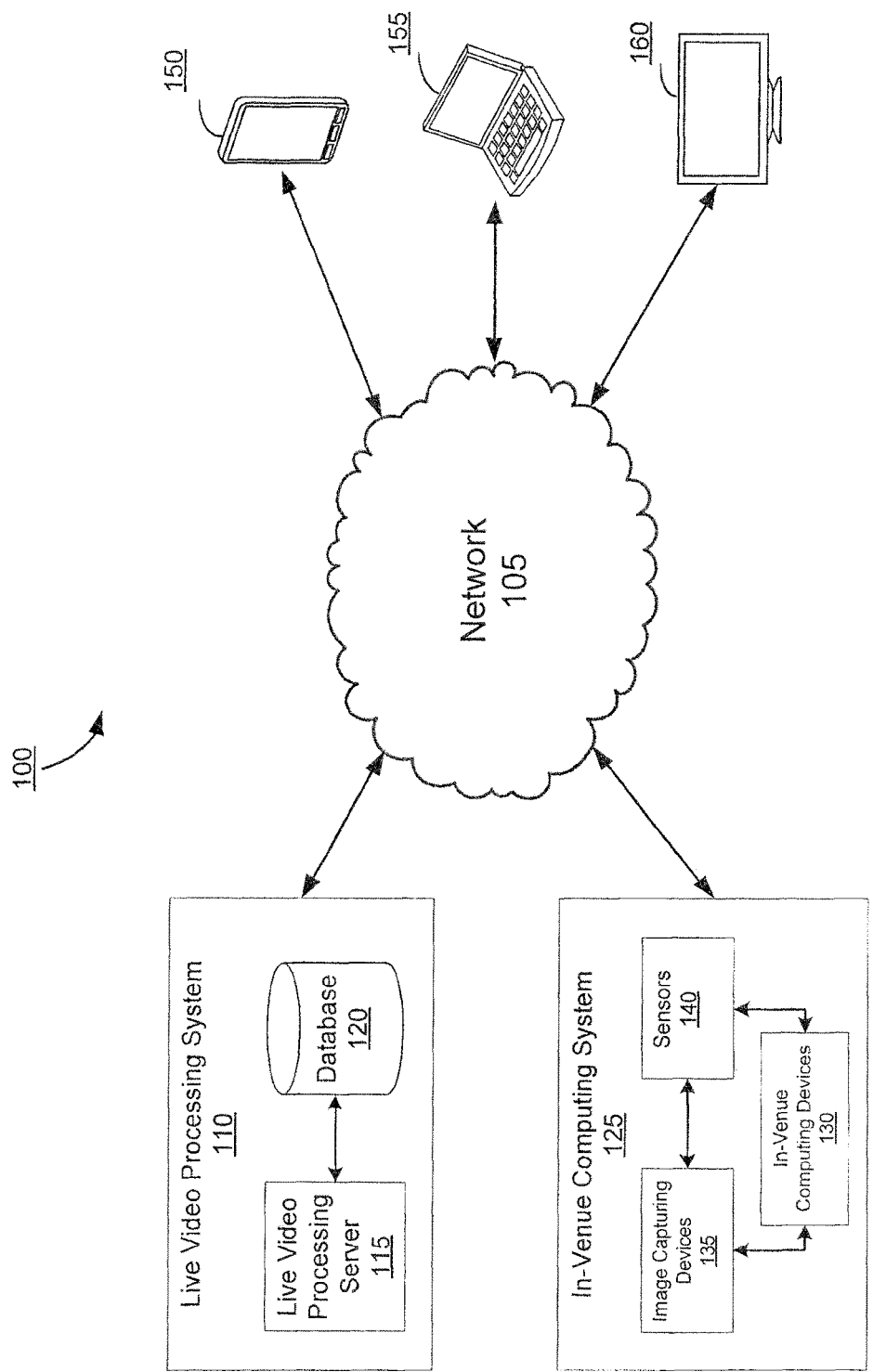
FIG. 1 is a block diagram depicting an example system of live video feeds, according to an illustrative implementation.

The details of various implementations of the methods and systems are set forth in the accompanying drawings and the description below.

DETAILED DESCRIPTION

Following below are more detailed descriptions of various concepts related to, and implementations of, methods, apparatuses, and systems of real-time streaming of a dedicated live video feed via a communication network to a plurality of user devices for automatic presentation. Before turning to the more detailed descriptions and figures, which illustrate the exemplary implementations in detail, it should be understood that the application is not limited to the details or methodology set forth in the descriptions or illustrated in the figures. It should also be understood that the terminology is for the purpose of description only and should not be regarded as limiting.

The exemplary embodiments are directed to a method generating a live video feed. The method is performed at a server connected to a computer network. The method includes receiving an indication of a predetermined type of action during a live event. The method includes generating a first video feed associated with the predetermined type of action, the first video feed being distinct from a broadcast feed of the live event. The method includes identifying a user device that is to receive the first video feed based on predetermined rules. The method includes determining whether the user device is prepared to receive the first video feed. When the user device is prepared, the method includes transmitting the first video feed to the user device for an automatically playback on the user device to display a video of the predetermined type of action currently occurring during the live event.

The exemplary embodiments are directed to a server generating a live video feed. The server includes a transceiver configured to establish a connection to a computer network that a user device is connected. The transceiver receives an indication of a predetermined type of action during a live event. The server includes a processor generating a first video feed associated with the predetermined type of action. The first video feed is distinct from a broadcast feed of the live event. The processor identifies a user device that is to receive the first video feed based on predetermined rules. The processor determines whether the user device is prepared to receive the first video feed. When the user device is prepared, the transceiver transmits the first video feed to the user device for an automatically playback on the user device to display a video of the predetermined type of action currently occurring during the live event.

The exemplary embodiments are directed to a system generating a live video feed. The system includes an in-venue computing system configured to capture information associated with a live event and generate an indication that a predetermined type of action has occurred during the live event. The system includes a server receiving the indication. The server generates a first video feed associated with the predetermined type of action. The first video feed is distinct from a broadcast feed of the live event. The server identifies a user device that is to receive the first video feed based on predetermined rules. The server determines whether the user device is prepared to receive the first video feed. When the user device is prepared, the server transmits the first video feed to the user device for an automatically playback on the user device to display a video of the predetermined type of action currently occurring during the live event.

FIG. 1 is a block diagram depicting an example system 100 of live video feeds, according to an illustrative implementation. The system 100 includes a live video processing system 110 communicating with an in-venue computing system 125 and a plurality of user devices 150, 155, and 160 via a network 105. The network 105 can include any computer networks or communications networks through which information can be transmitted and received. For example, the network 105 can include a local area network (LAN) such as a WiFi network, a wide area network (WAN), a wired or wireless telecommunications network, a television network, a radio network, a satellite network, a cellular network, the Internet, and any other medium through which information can be communicated.

The live video processing system 110 can include one or more live video processing servers 115 and one or more databases 120. The live video processing server 115 can include one or more processors and a memory. The processor can be one or more microprocessors, CPUs, application specific integrated circuits (ASICs) or one or more other integrated circuits. The processor can execute instructions stored in non-transitory computer-readable media for performing operations described herein. The memory can include any type of computer memory or electronic storage device capable of providing the processor with program instructions and can include hard disk, tape, floppy disk, memory registers, CD-ROM, DVD, magnetic disk, memory chip, flash memory, read-only memory (ROM), random-access memory (RAM), optical media, etc. The memory can be a non-transitory memory used to store computer-readable instructions that, when executed by the processor, cause the processor to perform the operations described herein. The databases 120 can be local to the live video processing system 110 or can be remote to the live video processing system 110 and communicates with the live video processing system 110 via the network 105. The databases 120 can store historical and statistical data, video, and rules used by the living video processing system 110.

The in-venue computing system 125 can include one or more in-venue computing devices 130, one or more image capturing devices 135, and one or more sensors 140. The image capturing devices 135 can include high-resolution cameras, three-dimensional (3D) cameras, and other video cameras used to capture events and actions in a field or stadium. The sensors 140 can include speed sensors, accelerations sensors, radar sensors, and other sensing devices used to track movements and obtain information in the field or stadium. For example, an array of radar equipment using radio waves to determine the range, angle or velocity of objects can be used. The image capturing devices 135 and sensors 140 can be installed at various locations of a venue or other places where a sporting event, concert or other activities take place. The in-venue computing devices 130 can include one or more processors and a memory, and can be similar to the live video processing server 115 described herein above. In some implementations, the in-venue computing devices 130 can process raw data obtained from the image capturing devices 135 and sensors 140 to generate packets and transmit the packets to the live video processing server 115 for further processing. In some implementations, the in-venue computing devices 130 can include user devices operated by respective users to record events. As those skilled in the art will understand, the users may be contractors, full-time users, or both who input data from the live event (e.g., in real time). The in-venue computing devices 130 may be disposed with the capturing devices 135 and the sensors 140 at the location where the event to be captured is taking place. For example, a proximity of the in-venue computing devices 130 to the capturing devices 135 and the sensors 140 may enable a lower latency in processing the data that is being received from the capturing devices 135 and the sensors 140. Thus, once processed by in-venue computing devices 130, the processed data may be provided to the live video processing system 110. However, the common disposition of the in-venue computing devices 130 with the capturing devices 135 and the sensors 140 is only exemplary. For example, the in-venue computing devices 130 may be disposed remotely relative to the image capturing devices 135 and the sensors 140. That is, the in-venue computing devices 130 may be disposed outside the location of the venue where the event is taking place.

The plurality of user devices can include mobile devices 150, computing devices 155, and televisions 160 that can receive information from the live video processing system 110 directly or indirectly via the network 105. The mobile devices 150 can include any portable devices that can be handheld, such as smart phones, tablets, personal digital assistants, etc. The computing devices 155 can include any computing devices or personal computers, such as desktops, laptops, workstations, server devices, media servers, home entertainment gateways, etc. The mobile devices 150 and the computing devices 155 can receive streaming video and data from the live video processing system 110 via Internet broadcast or other methods. The televisions 160 can be any telecommunication medium used for displaying/outputting moving images and sounds. The televisions 160 can include set-top boxes as well as Over-The-Top content (OTT) devices. The televisions 160 can receive information from the live video processing system 110 directly or indirectly via television broadcast, Internet broadcast, or other methods. For example, the televisions 160 can receive video and data from the live video processing system 110 via programs broadcasted by an entertainment network. An internet-enabled television 160 can receive streaming video and other content via the Internet. The user devices 150, 155 and 160 can each include one or more processors and a memory. The memory can be a non-transitory memory used to store computer-readable instructions that, when executed by the processor, cause the processor to perform operations described herein.

Figure 2:
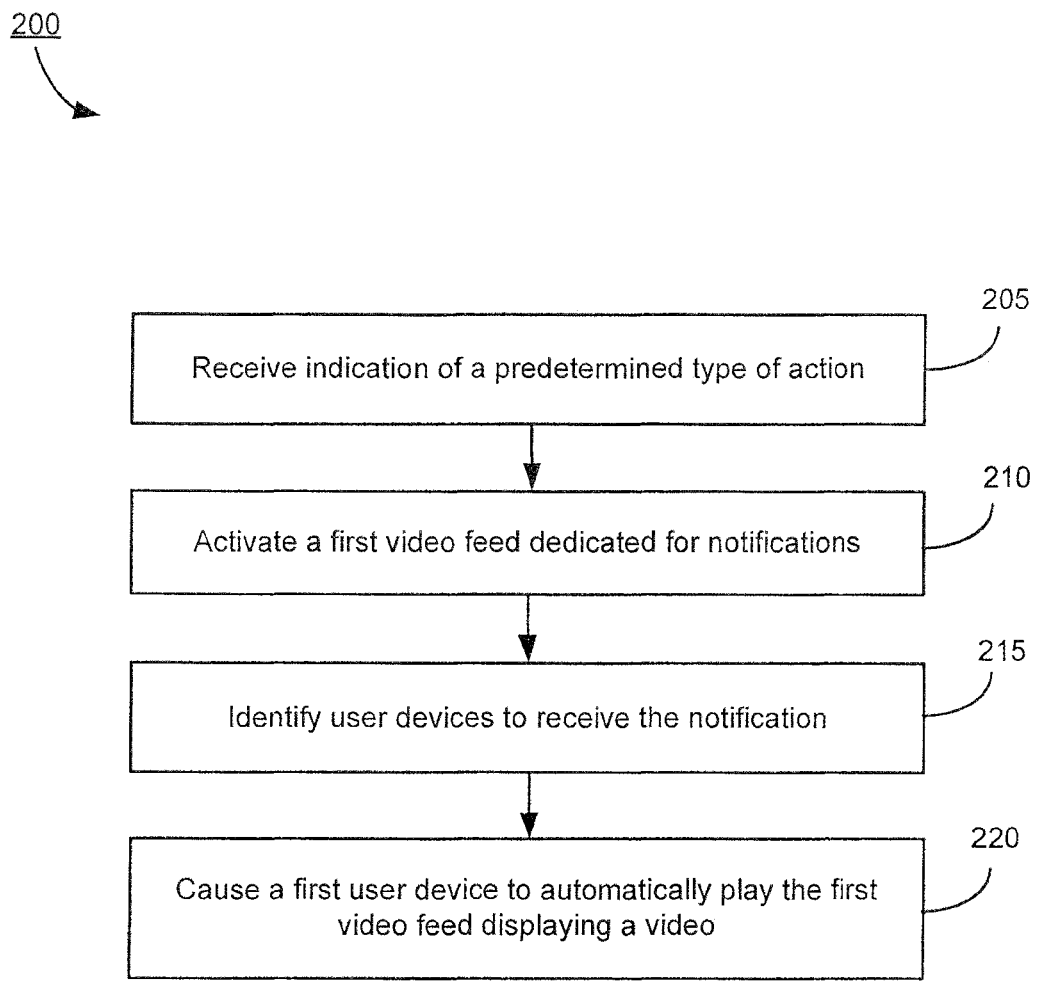
FIG. 2 is a flow diagram depicting an example method of live video feeds, according to an illustrative implementation.

FIG. 2 is a flow diagram depicting an example method 200 of live video feeds, according to an illustrative implementation. Specifically, the method 200 is directed to a set of operations performed by the live video processing system 110 to determine when a video feed is to be pushed to the user devices 150, 155, and 160. In brief overview, the method 200 can include receiving, by a server via a computer network, an indication of a predetermined type of action during a live event (operation 205). The method 200 can include activating, by the server, a first video feed dedicated for notifications of a plurality of predetermined types of actions (operation 210). The method 200 can include identifying, by the server, a plurality of user devices to receive a notification of the predetermined type of action (operation 215). The method 200 can include causing a first user device to automatically play the first video feed displaying a video of the predetermined type of action currently occurring during the live event (operation 220).

Referring now to FIGS. 1 and 2 together, in further detail, the method 200 can include receiving, by a server via a computer network, an indication of a predetermined type of action during a live event (operation 205). For example, the live video processing server 115 can be configured to receive an indication of a predetermined type of action during a live event via the network 105 from the in-venue computing device 130. The predetermined type of action can be one of a plurality of predetermined types of actions. In some implementations, the predetermined types of actions can be critical or important events occurred during a live event, such as a live sporting game. For example, the last few minutes of a sporting game can be considered critical or important when the two competing teams have a tie score. As another example, a power play during an ice hockey game can be considered a critical or important event when one team is penalized by having the number of players on the field of play temporally reduced. The exemplary embodiments may also consider a plurality of other types of actions that may occur during the live event. The exemplary embodiments may also be configured to consider types of actions that occur outside the live event. For example, in the sporting world, a result from a first team involved in a first live event may affect a second team (e.g., standings). Thus, when applicable (e.g., to users who indicated actions for live events involving the second team be pushed), a predetermined type of action that occurs in the first live event including the first team may also be identified. In some implementations, when a predetermined type of action occurs during a live event, the in-venue computing device 130 can transmit an indication of the action to the live video processing server 115. For example, the in-venue computing device 130 can be operated by a user to record a critical or important event and send a notification or message to the live video processing system 110. It is noted that the in-venue computing system 125 may be configured to determine when a predetermined type of action occurs using any of a variety of techniques. For example, the in-venue computing system 125 may include a rules-based detection operation in which at least one criteria defines each predetermined type of action. Thus, when a set of criteria for a given predetermined type of action is satisfied based on the data from the image capturing devices 135 and the sensors 140, the in-venue computing devices 130 may determine that the given predetermined type of action has occurred or will occur.

In some implementations, the method 200 can include activating, by the server, a first video feed dedicated for notifications of the plurality of predetermined types of actions responsive to receiving the indication of the predetermined type of action (operation 210). For example, the live video processing server 115, upon receiving the indication of a predetermined type of action, can activate a live video feed dedicated for notifications of the plurality of predetermined types of actions. In some implementations, the live video processing system 110 can broadcast the live event via various video feeds to subscribers. The subscribers, in turn, can watch the live event on their devices, such as user devices 150, 155, and 160. In some implementations, when the live video processing server 115 receives the indication that a predetermined type of action is occurring or is about to occur, the live video processing server 115 can activate a video feed that is dedicated or reserved only for notification of the plurality of predetermined types of actions. The dedicated video feed can be a video feed distinct from other video feeds that are used for broadcasting the live event and is activated only when one or more of the plurality of the predetermined types of actions occur. For example, resources such as a dedicated source Internet Protocol (IP) address for the video feed can be reserved for use only when one or more of the predetermined types of actions occur. In an exemplary embodiment, the video feed that is dedicated for notifications may be based on data from the image capturing devices 135 and the sensors 140. Thus, the image capturing devices 135 and the sensors 140 may enable identification of a predetermined type of action (by the in-venue computing devices 130 as described above) and may also capture data that is used in generating the video feed. In an alternative manner, the video feed may be extracted from a live feed as would be broadcast by an entity with broadcasting rights. Those skilled in the art will understand that the generation of the video feed or the use of the live feed may require a predetermined arrangement (e.g., for copyright or exclusivity privileges). In the exemplary embodiments and as noted above, the live video processing system 110 may also be configured to generate the video feed as a separate, distinct feed that is independent of the live feed of the live event. In this manner, the live video processing system 110 may control how the video feed is subsequently pushed to the user devices 150, 155, and 160. As a further control mechanism, the video feed may be generated with a predefined, finite duration (e.g., 2 minutes).

In some implementations, the method 200 can include identifying, by the server, a plurality of user devices to receive a notification of the predetermined type of action based on a plurality of predetermined rules (operation 215). For example, the live video processing server 115 can identify a plurality of user devices to receive the notification of the predetermined type of action. In some implementations, the database 120 can store information of a plurality of subscribers who have subscribed one or more particular services provided by the live video processing system 110. For example, users of the user devices 150, 155, and 160 can subscribe one or more particular services provided by the live video processing system 110 via a web application or an application installed on the user devices 150, 155, and 160.

In some implementations, the user devices 150, 155 and 160 can have software, such as an application ("app") associated with the service provided by the live video processing system 110 installed. For example, the mobile device 150 (e.g., a smart phone) can have a mobile app installed, the computing devices 155 can have a desktop app (e.g., via a browser, using a media player, etc.) installed, and the televisions 160 can have a smart TV app installed. In general, an app can be a computer-executable program designed to perform a group of coordinated operations. In some implementations, the apps installed on the user devices 150, 155, 160 can allow subscribers to watch high-definition quality sporting games via the Internet. The apps can also allow subscribers to view game and team data, statistics, and other information. In some implementations, users can access the service provided by the live video processing system 110 via a web application runs in a web browser of the user devices 150, 155, 160.

In some implementations, the database 120 can store a plurality of predetermined rules for determining which user device is to receive notifications of the predetermined types of actions. For example, one rule may specify that only subscribers of a particular service provided by the live video processing system 110 can receive notifications of the predetermined types of actions. Another exemplary rule may specify that only subscribers who have expressed interests of the predetermined types of actions can receive notifications of the predetermined types of actions. Another exemplary rule may specify that user devices located in certain geographic areas may not receive notifications of predetermined types of actions associated with an event even if users of the user devices have subscribed to the particular service provided by the live video processing system 110. Another exemplary rule may specify that certain subscribers may receive only text notifications while certain other subscribers may receive a full range of notifications including text, audio, and video notifications.

In some implementations, the rules may be determined based on user preference, or determined by the live video processing system 110, or a combination of both. In some implementations, the notifications can only be sent to a subscriber if the subscriber opts in (e.g., express permission) with respect to the notification. In some implementations, the live video processing system 110 can determine a subscriber or user device may likely be interested in the predetermined types of actions or certain events based on subscriber or device information. In a particular implementation, the users of the user devices 150, 155, and 160 may indicate preferences. The preferences may include general information. For example, the general information may be a particular sport, a team name, an athlete, a singer, a type of event, etc. When general information is provided, the live video processing system 110 may be configured to identify predetermined types of actions that are to be associated with the user for purposes of performing operation 215. For example, when an athlete is indicated, the live video processing system 110 may determine that the predetermined types of actions may include when the athlete is involved in a highlight, when the athlete is performing an act, etc. In another example, when a user identifies a team name, the live video processing system may determine that the predetermined types of actions may include when a game involving the user's team is about to start or about to end, when the user's team is about to enter a particular action (e.g., a power play), etc. In a further example, as noted above, when a user identifies a team name, the live video processing system 110 may also be configured to identify predetermined types of actions in live events that do not involve the user's team. The preferences may also include specific information. For example, the specific information may be select ones of the predetermined types of actions. The preferences may also be based on other available information. For example, a viewing history or other historical information linked to the users of the user devices 150, 155, and 160 may be used in generating profiles or other databases that for the basis upon which to associate predetermined types of actions. In this manner, the users may be associated with predetermined types of actions from a manually or automatically determined manner so that the live processing system 110 may identify which ones of the users devices 150, 155, and 160 that are to receive a notification of a particular predetermined type of action.

In some implementations, the method 200 can include causing a first user device among the plurality of user devices to automatically play the first video feed displaying a video of the predetermined type of action currently occurring during the live event (operation 220). For example, the live video processing server 115 can cause a first user device to automatically play the first video feed displaying a video of the predetermined type of action currently occurring during the live event. In some implementations, after identifying the plurality of user devices to receive the notification of the predetermined type of action that is occurring or is about to occur, the live video processing server 115 streams the first video feed dedicated for notifications of the plurality of predetermined types of actions to the plurality of identified user devices.

In some implementations, a user device can be identified by an application identifier ("ID") of the app that is installed on the user device. As described herein above, apps associated with services provided by the live video processing system 110 can be installed on the user devices 150, 155 and 160. In some implementations, each app can have a unique ID identifying a particular app installed on a particular user device. The live video processing server 115 can stream the first video feed to the identified user devices based on the unique IDs of the apps installed on the user devices. In some implementations, the live video processing server 115 can stream the first video feed to the user devices using device IDs of the user devices. In some implementations, the live video processing server 115 can identify user devices based on the IP address of a device and stream the first video feed to the user device using the IP address. In some implementations, a user may access the service provided by the live video processing system 110 via a web application, and the live video processing server 115 can identify user devices based on the login information and IP address of the user device that the user logged in.

In some implementations, the live video processing server 115 can communicate with the user devices 150, 155 and 160 and cause the user devices 150, 155 and 160 to display video of the first video feed. For example, the apps installed on the user devices 150, 155 and 160 or the web application runs in a web browser of the user devices 150, 155 and 160 can be executed by one or more processors of the user devices 150, 155 and 160 to receive and display the first video feed. One example of a user device automatically displaying the first video feed is illustrated in FIG. 3.

Figure 3:
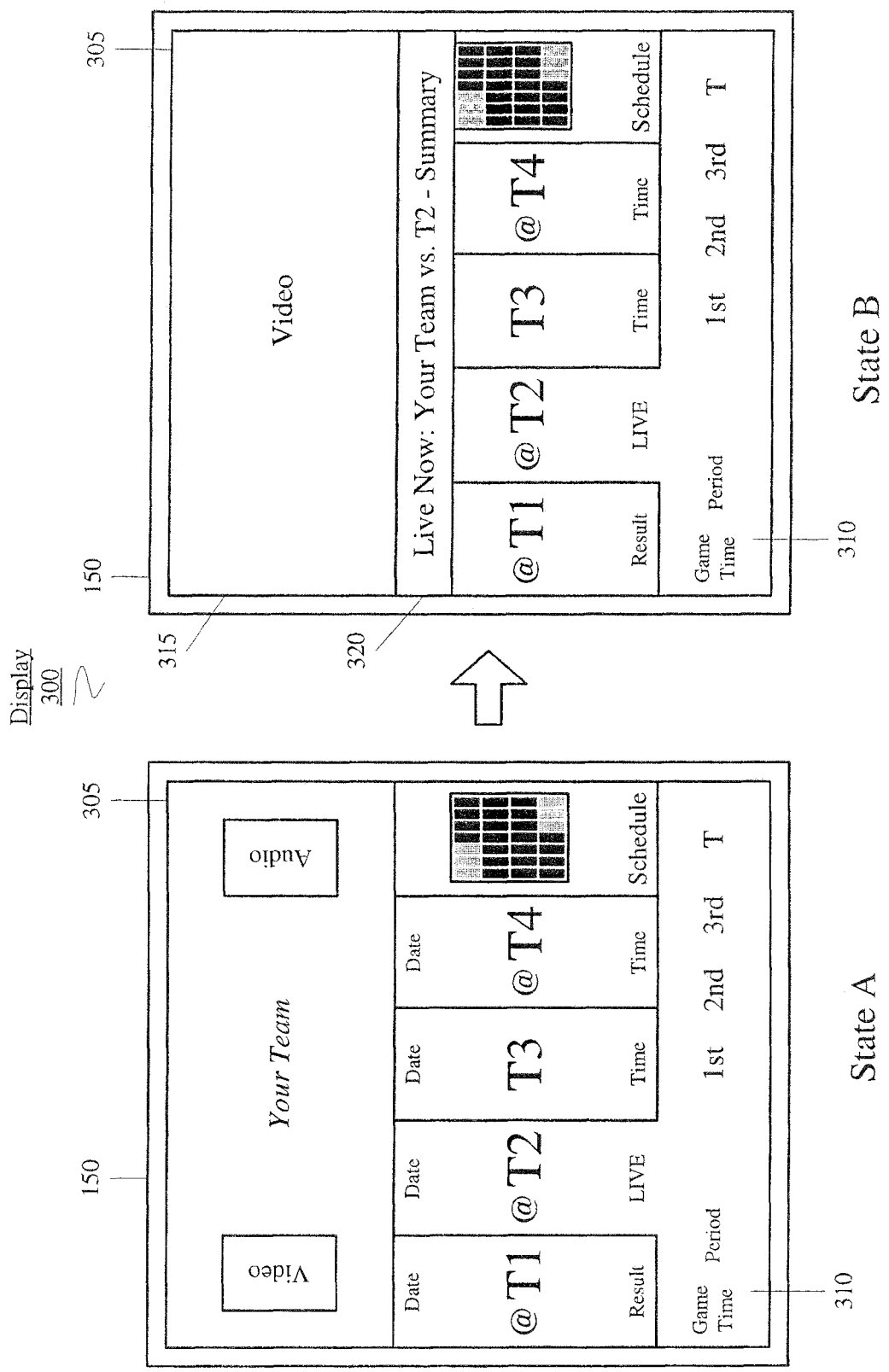
FIG. 3 is a block diagram depicting an example display of live video feeds, according to an illustrative implementation.

FIG. 3 is a block diagram depicting an example display 300 of live video feeds, according to an illustrative implementation. As shown in FIG. 3, for example, a user device (e.g., user device 150 in FIG. 1) at state A shows a screen 305 that displays game data 310 of a sporting event. Continuing with this example, the user device 150 receives signals of the first video feed from the live video processing system 110 via the network 105. At state B, the user device 150 surfaces the video 315 of the first video feed automatically without any user action to inform the user of the user device 150 that a predetermined type of action is currently occurring or is about to occur during the live event. In some implementations, a caption 320 can be displayed at the same time with the video 315 to let the user know what kind of action is occurring or is about to occur. The video 315 can be any size as long as it fits into the screen 305 and can be surfaced on the screen 305 at any locations. For example, the video 315 in the example in FIG. 3 is displayed at the top banner of the screen 305. In other implementations, the video 315 can be displayed at other locations of the screen 305.

Figure 4:
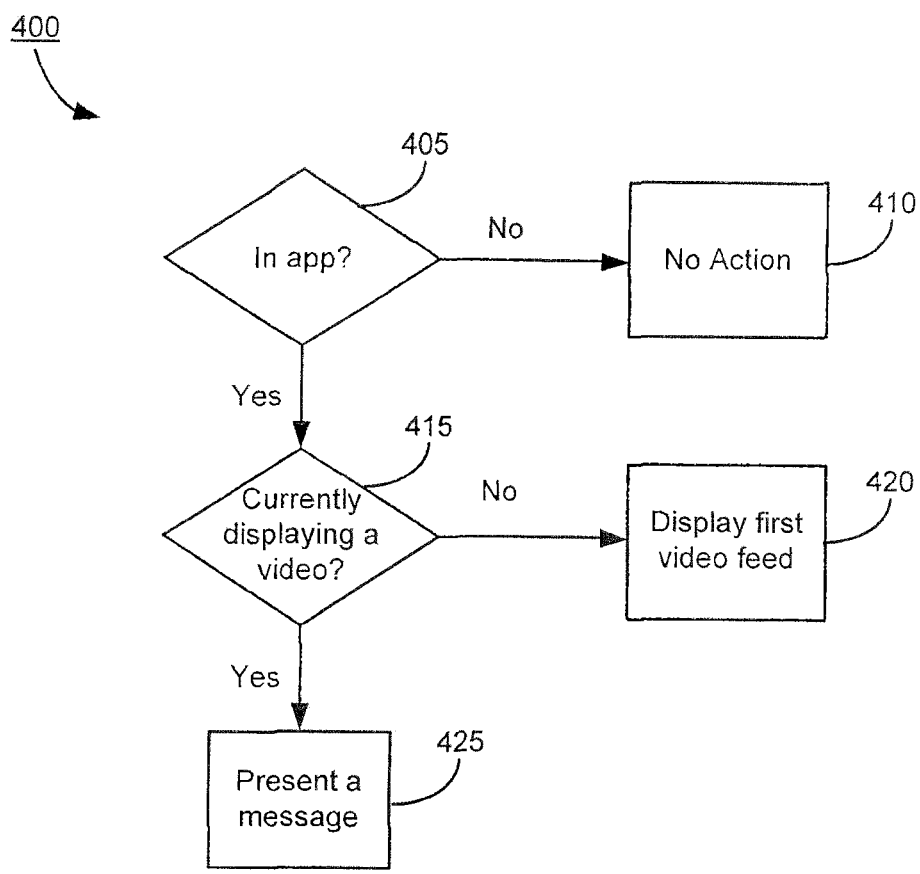
FIG. 4 is a flow diagram depicting an example method of live video feeds, according to an illustrative implementation.

FIG. 4 is a flow diagram depicting an example method 400 of live video feeds, according to an illustrative implementation. Specifically, the method 400 includes a set of operations performed by the live video processing system 110 to push a video feed to an identified user device. Accordingly, the method 400 may relate to a specific user device that was identified as described above in the method 200. In brief overview, the method 400 can include determining whether the identified user device currently has a particular app used to display a pushed video feed to be launched, i.e., in-app (operation 405). When the identified user device currently does not have the particular app launched, the method 400 can include that no action is taken and not displaying the first video feed or presenting any message (operation 410). However, when the identified user device does currently have the particular app launched, the method 400 can include determining whether the identified user device is currently playing a video (operation 415). When the identified user device is not currently playing a video, the method 400 can include causing the identified user device to automatically play the first video feed displaying the video of the predetermined type of action currently occurring during the live event via the particular app (operation 420). However, when the identified user device is currently playing a video that is not of the live event, the method 400 can include causing the user device to present a message indicating the predetermined type of action without playing the first video feed (operation 425).

Referring now to FIGS. 1 and 4 together, in further detail, the method 400 can include determining whether the identified user device currently has a particular app used to display a pushed video feed to be launched, i.e., in-app (operation 405). In some implementations, the user device (e.g., 150, 155 or 160) can check whether a particular app is launched on the user device when receiving the packets of the first video feed transmitted from the live video processing server 115. For example, the operating system of the user device or another app on the user device can check whether the particular app is launched on the user device where the check may be a polling operation such as a message from the server or the app requesting if there is any new data with regard to the app being launched. In a particular example, the live video processing system 110 may transmit a request to the identified user device regarding whether the particular app is currently launched. In response, the identified user device may transmit data indicative of whether the particular app is currently launched. In a first exemplary manner, the identified user device may generate and transmit information associated with a task manager of currently running applications on the user device to the live video processing system 100. In a second exemplary manner, the identified user device may determine a current status of whether the particular app is currently launched so that a direct indication is generated and transmitted to the live video processing system 100. Based on the response from the identified user device, the live video processing system 110 may determine whether the particular app is launched on the identified user device. In some implementations, the particular app can be an app downloaded (or obtained using other methods) from the live video processing system 110 and installed on the user device or running in a web browser of the user device as described herein above.

When the identified user device currently does not have the particular app launched, the method 400 can include that no action is taken and not displaying the first video feed or presenting any message (operation 410). For example, the packets of the first video feed may be dropped by the identified user device without further processing (no action). However, it is noted that in some implementations, operation 405 may be skipped. As a result, the first video feed can be displayed to notify the user of the predetermined type of action even when the particular app is not launched on the user device (i.e., user is not in the app).

In some implementations, when the identified user device does currently have the particular app launched, the method 400 can include determining whether the identified user device is currently playing a video (operation 415). The live video processing system 110 may perform this determination based on information received from the identified user device. For example, the live video processing system 110 may transmit another request for the identified user device to indicate whether a video is being played on the particular app. In another example, the previous response from the request regarding the particular app being launched may also include this indication. From the perspective of the identified user device, after determining that the particular app is launched on the user device, the particular app may be placed in the foreground if not already in the foreground. For example, the particular app may be launched and be in the foreground as it is being used by the user of the identified user device. In another example, the particular app may be launched and a different app may be in the foreground. Thus, the identified user device may instead place the particular app to the foreground. In an exemplary embodiment, with particular app may be privy to receipt of the request from the live processing system 110 that triggers this foreground operation. Subsequently, the particular app executed by the processor of the user device can check whether the user device is currently playing a video (e.g., a video is displayed on the screen of the user device), particularly via the particular app. If it is determined that the user device is currently not playing a video, the particular app executed by the processor of the user device can be configured to display the first video feed (operation 420) for example as described herein above in relation to FIG. 3. On the other hand, if it is determined that the user device is currently playing a video that is not of the live event, the particular application executed by the processor of the user device can be configured to present a message indicating the predetermined type of action without playing the first video feed (operation 425). For example, a text message may be displayed on the screen of the user device or an audio message may be read by the user device to inform the user that the live event is currently occurring or is about to occur. By displaying the video of the live video feed automatically to the subscribers who are interested in the live event, the systems and methods described herein provide users with enjoyable experience of the event. By displaying the video of the live event only when no video is displayed on the device, system and device resources (e.g., CPU processing power, memory, battery, etc.) can be saved.

Figure 5:
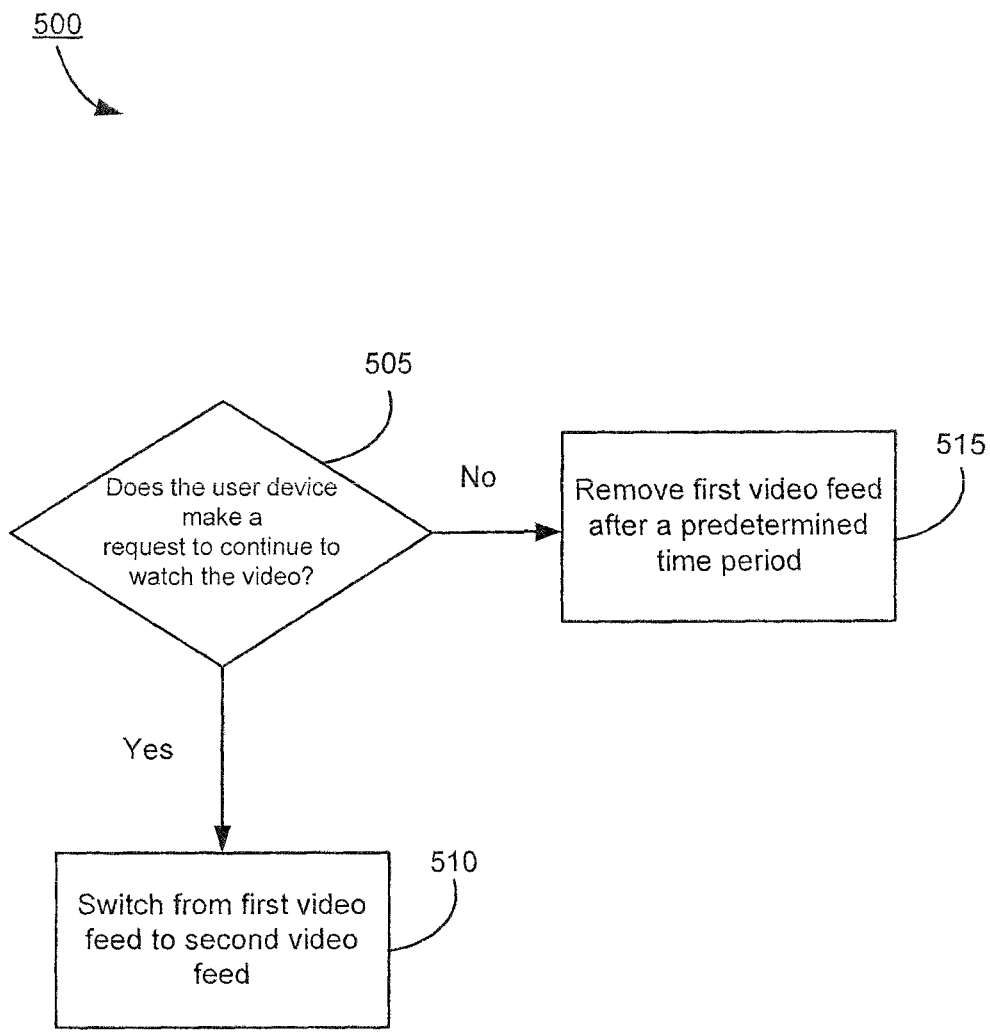
FIG. 5 is a flow diagram depicting an example method of live video feeds, according to an illustrative implementation.

FIG. 5 is a flow diagram depicting an example method 500 of live video feeds, according to an illustrative implementation. Specifically, the method 500 is directed to a set of operations performed by the live video processing system 110 when the video feed that was pushed (e.g., using the method 400) is playing or completed. The live video processing system 110 maybe configured to provide an option to switch from the video feed to the live feed of the event. In brief overview, the method 500 can include determining whether the live video processing system 110 receives from the user device a request to continue to watch the live event associated with the first video feed (operation 505). When the live video processing system 110 receives a request from the user device to continue to watch the live event associated with the first video feed, the method 500 can include switching the user device from the first video feed to a second video feed (e.g., a live feed) that is playing the live event (operation 510). When a predetermined time period lapses without receiving the request, the method 500 can include causing the first video feed displaying the video of the predetermined type of action to be automatically removed from the user device (operation 515).

Referring now to FIGS. 1 and 5 together, in further detail, the flow 500 can include determining whether the live video processing system 110 receives from the user device a request to continue to watch the live event associated with the first video feed (operation 505). For example, the live video processing server 115 can determine if a request to continue to watch the video of the first video feed is received from the user device (e.g., 150, 155 or 160). In an exemplary embodiment, upon the first video feed pushed, the live video processing system 110 may provide an option to switch from the first video feed to a live feed of the live event. Accordingly, the particular app running on the user device may include this option so that a request may be transmitted from the user device to the live video processing system 110. It is noted that since the switch is for a live feed from a broadcasting entity, there may be further verification operations to ensure that the user of the user device is entitled to receiving the live feed (e.g., has subscription rights). Therefore, the live video processing system 110 may be configured to perform this determination upon receiving the request or before providing the option. If the user does not have an entitlement, the live video processing system 110 may deny the request or omit including the option in the particular app. In some implementations, a user of the user device 150, 155, or 160 can make an indication that the user wishes to continue to watch the live event associated with the first video feed that was automatically surfaced on the user device. For example, the user can tap the portion of screen of the user device that displays the video of the first video feed. In some implementations, a button may be displayed to ask if the user wishes to continue to watch the video of the first video feed. In some implementations, upon receiving a tap, a click of a button, or other user actions indicating that the user wishes to continue to watch the live event associated with the first video feed, the app of the user device executed by the processor of the user device can transmit the request to the live video processing server 115. For example, the app of the user device can cause a network interface (e.g., a network interface card) of the user device to communicate with the live video processing server 115 to transmit a signal corresponding to the request.

In some implementations, when the live video processing system 110 receives the request from the user device to continue to watch the live event associated with the first video feed, the method 500 can include switching the user device from the first video feed to a second video feed that is playing the live event (operation 510). In some implementations, the live video processing server 115 can receive a request from the user device (e.g., 150, 155 or 160) to continue to watch the live event in the first video feed. Upon receiving the request, the live video processing server 115 stops streaming the first video feed (if not completed) to the user device while starting to stream a second video feed of the same live event. As described herein above, the first video feed is dedicated for notification of the plurality of predetermined types of actions only. The first video feed is also a separate, distinct video feed of finite duration that is independent of the live feed. That is, the first video feed may be a notification video feed showing a sequence from the live event that is of a discrete length shorter than a duration of the live event. The discrete, finite duration may be defined in a variety of manners such as a predetermined duration using a real clock (e.g., a server system clock) or a game clock, a length corresponding to the action associated with the first video feed (e.g., a number of points scored). A length of the discrete, finite duration may also be defined by an entity that owns the rights to the live event (e.g., a sporting association, a broadcasting channel, etc.). Thus, once the user decided to watch the live event, the live video processing system 110 streams a normal video feed (e.g., a broadcast feed) intended for regular user viewing to the user device.

In some implementations, when a predetermined time period lapses without receiving the request, the method 500 can include causing the first video feed displaying the video of the predetermined type of action to be automatically removed from the user device (operation 515). For example, the live video processing server 115 can cause the first video feed displaying the video of the predetermined type of action to be automatically removed from the user device. The predetermined time period can be 5 seconds, 10 seconds, 20 seconds, or any other time period (e.g., 2 minutes). Initially, the first video feed may be stopped. In a first example, since the first video feed is a separate, distinct video feed of a finite duration, the first video feed may play out to completion. Accordingly, the first video feed may stop upon the entirety of the first video feed being shown. The predetermined time period may correspond to the duration of the first video feed. In a second example, the first video feed may be stopped prematurely when a user input is received. The user input may correspond to a stop input that causes the first video feed to stop playing out. The user input may also correspond to the above noted request to switch to the live feed. Accordingly, the first video feed may stop prior to the entirety of the first video feed being shown. Once the first video feed has been stopped, the first video feed may be removed. The removal of the first video feed may entail the user device receiving an indication that the first video feed has concluded or is otherwise no longer available such that the first video feed may no longer be selected for viewing. For example, the first video feed may include the indication. In another example, the live video processing server 115 may transmit the indication to the user device. At the video level on the user device, a slate may be used to avoid violating any rights of the entity owning the live event (e.g., cover a media player window).

While embodiments described herein may be implemented in the context of a sports game, it will be recognized that the various embodiments may also be implemented in the context of other events. Furthermore, it is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill would further appreciate that the various illustrative logical blocks, modules, circuits, and algorithm steps described in connection with the embodiments disclosed herein may be implemented as electronic hardware, computer software embodied or stored in non-transitory computer-readable medium, or combinations of both. To clearly illustrate this interchangeability of hardware and software embodied in non-transitory computer-readable medium, various illustrative components, blocks, modules, circuits, and steps have been described above generally in terms of their functionality. Whether such functionality is implemented as hardware or software stored in non-transitory computer-readable medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative blocks, methods, operations described in connection with the embodiments disclosed herein may be implemented or performed with a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any processors, controllers, microcontrollers, CPU etc. A processor may also be implemented as a combination of computing devices, e.g., a combination of a DSP and a microprocessor, a plurality of microprocessors, one or more microprocessors in conjunction with a DSP core, or any other such configuration.

The steps of a method or operation described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary non-transitory storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software embodied in a non-transitory computer readable medium, firmware, or any combination thereof. Such hardware, software embodied in a non-transitory computer readable medium, firmware, or any combination thereof may part of or implemented with any one or combination of the servers, databases, associated components in the system, components thereof, or the like. A computer-readable storage media may be any available media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method, comprising: at a server connected to a computer network:
   processing raw data from an image capture device and a sensor, wherein the processing generates an indication that a predetermined type of action is about to occur within a venue hosting a live event;
   determining that a first live video feed of the live event is to be streamed based on the indication of the predetermined type of action, the first live video feed being a live video feed of the live event that is distinct from a broadcast video feed of the same live event, wherein the first live video feed has a predefined, finite duration that is less than the duration of the broadcast video feed;
   identifying a user device associated with a subscriber that is to receive the first live video feed based on predetermined rules;
   determining whether the user device is prepared to receive the first live video feed; and
   when the user device is prepared, transmitting the first live video feed to the user device.

2. The method of claim 1, wherein the predefined, finite duration is based on one of a server system clock, a game clock tracking the live event, or a length corresponding to the predetermined type of action.

3. The method of claim 1, wherein the predefined, finite duration is defined by an entity owning rights to the live event.

4. The method of claim 1, further comprising:
   receiving a request to view the broadcast video feed, indicating that the user device has requested to switch to the broadcast video feed.

5. The method of claim 4, further comprising:
   verifying that one of the user device or a user using the user device is entitled to view the broadcast video feed.

6. The method of claim 1, wherein the user device is prepared when one of the user device is not currently playing a video, the user device has a particular application launched thereon, or a combination thereof.

7. The method of claim 6, further comprising:
   transmitting a status request to the user device to identify one of whether the user device is currently playing a video, whether the user device has a particular application launched thereon, or a combination thereof; and
   receiving a response to the status request from the user device.

8. The method of claim 7, wherein, when the user device is unprepared to receive the first live video feed, transmitting a message to be presented on the user device indicating that the predetermined type of action is occurring in the live event without displaying the first live video feed.

9. The method of claim 1, further comprising:
   receiving user information indicative of a preference to receive the first live video feed based on the predetermined rules.

10. A server, comprising:
    a transceiver configured to establish a connection to a network; and
    a processor configured to perform operations, comprising:
    processing raw data from an image capture device and a sensor, wherein the processing generates an indication that a predetermined type of action is about to occur within a venue hosting a live event;
    determining that a first live video feed of the live event is to be streamed to one or more subscribers based on the indication of the predetermined type of event, the first live video feed being a live video feed that is distinct from a broadcast video feed of the same live event, wherein the first live video feed has a predefined, finite duration that is less than the duration of the broadcast video feed;
    identifying a user device associated with a subscriber that is to receive the first live video feed based on predetermined rules; and
    determining whether the user device is prepared to receive the first live video feed, wherein, when the user device is prepared, the transceiver transmits the first live video feed to the user device.

11. The server of claim 10, wherein the predefined, finite duration is based on one of a server system clock, a game clock tracking the live event, or a length corresponding to the predetermined type of action.

12. The server of claim 10, wherein the predefined, finite duration is defined by an entity owning rights to the live event.

13. The server of claim 10, wherein the transceiver receives a request to view the broadcast video feed, and wherein the processor generating an indication that the user device has requested to switch to the broadcast video feed.

14. The server of claim 13, wherein the processor verifies that one of the user device or a user using the user device is entitled to view the broadcast video feed.

15. The server of claim 10, wherein the user device is prepared when one of the user device is not currently playing a video, the user device has a particular application launched thereon, or a combination thereof.

16. The server of claim 15, wherein the transceiver transmits a status request to the user device to identify one of whether the user device is currently playing a video, whether the user device has a particular application launched thereon, or a combination thereof, and wherein the transceiver receives a response to the status request from the user device.

17. The server of claim 16, wherein, when the user device is unprepared to receive the first live video feed, the transceiver transmits a message to be presented on the user device indicating that the predetermined type of action is occurring in the live event without displaying the first live video feed.

18. A system, comprising:
    an in-venue computing system configured to capture raw data from an image capture device and a sensor associated with a live event and using the raw data to generate an indication that a predetermined type of action about to occur within a venue hosting the live event; and
    a server receiving the indication, the server determining that a first live video feed of the live event is to be streamed to one or more subscribers based on the indication of the predetermined type of action, the first live video feed being a live video feed that is distinct from a broadcast video feed of the same live event, wherein the first live video feed has a predefined finite duration that is less than the duration of the broadcast video feed, the server identifying a user device associated with a subscriber that is to receive the first live video feed based on predetermined rules, the server determining whether the user device is prepared to receive the first live video feed, when the user device is prepared, the server transmitting the first live video feed to the user device.

19. The system of claim 18, wherein, after identifying the user device, sending a notification to the user device based on the predetermined type of action about to occur if a user of the user device has expressed interest in the predetermined type of action.

* * * * *